United States Patent [19]
Tao et al.

[11] Patent Number: 5,348,841
[45] Date of Patent: Sep. 20, 1994

[54] ORGANIC DYE-IN-POLYMER (DIP) MEDIUM FOR WRITE-ONCE-READ-MANY (WORM) OPTICAL DISCS

[75] Inventors: Hun-Jan Tao, Taichung; Hwa-Fu Chen, Hsinchu, both of Taiwan

[73] Assignee: Industrial Technology Research Institute, Chutung, Taiwan

[21] Appl. No.: 42,754

[22] Filed: Apr. 6, 1993

Related U.S. Application Data

[63] Continuation of Ser. No. 615,616, Nov. 19, 1990, abandoned.

[51] Int. Cl.$^5$ .............................. G03C 1/72; G11B 7/24
[52] U.S. Cl. .................................... 430/270; 430/495; 430/945; 369/288; 427/240; 427/384; 252/582; 252/587
[58] Field of Search ....................... 430/270, 495, 945; 369/288; 427/240, 384; 252/582, 587

[56] References Cited

U.S. PATENT DOCUMENTS

| | | | |
|---|---|---|---|
| 4,364,986 | 12/1982 | Zwanenburg et al. | 428/156 |
| 4,460,665 | 7/1984 | Kunikane et al. | 428/199 |
| 4,626,496 | 12/1986 | Sato et al. | 430/270 |
| 4,696,892 | 9/1987 | Abe et al. | 430/495 |
| 4,713,314 | 12/1987 | Namba et al. | 430/270 |
| 4,735,839 | 4/1988 | Sato et al. | 430/945 |
| 4,767,693 | 8/1988 | Oba et al. | 430/270 |
| 4,860,273 | 8/1989 | Sawano et al. | 369/275.1 |
| 4,944,981 | 7/1990 | Oguchi et al. | 369/288 |
| 4,946,761 | 8/1990 | Maemoto | 430/270 |
| 4,957,854 | 9/1990 | Oguchi et al. | 430/495 |
| 5,032,495 | 7/1991 | Albert et al. | 430/270 |
| 5,155,008 | 10/1992 | Yanagasawa et al. | 430/270 |
| 5,155,009 | 10/1992 | Yanagisawa et al. | 430/270 |
| 8,166,035 | 11/1992 | Kanno et al. | 430/945 |

FOREIGN PATENT DOCUMENTS

| | | | |
|---|---|---|---|
| 0051281 | 10/1981 | European Pat. Off. | |
| 236996 | 2/1990 | Japan | 430/270 |

OTHER PUBLICATIONS

K. Y. Law et al., "Ablative Optical Recording Using Organic Dye-in-Polyer Films," *Appl. Phys. Lett.*, 36(11), Jun. 1, 1980.
D. G. Howe et al., "Solvent-Coated Organic Materials for High-Density Optical Recording," *J. Vac. Sci. Technol.*, 18(1), Jan./Feb. 1981.
K. Y. Law et al., "Dye-in-Polymer Films for Ablative Optical Recording With GaAs Diode Lasers," *Appl. Phys. Lett.*, 39(9), Nov. 1, 1981.
V. B. Jipson, "Infrared Dyes for Optical Storage," *J. Vac. Sci. Technol.*, 18(1), Jan./Feb. 1981.
J. J. Wrobel, "Laser Marking of Thin Organic Films," *Appl. Phys. Lett.*, 40(11), Jun. 1, 1982.
D. J. Gravesteijn, "Organic-Dye Films for Optical Recording," *Philips Tech. Rev.*, 41, 325-333, 1983/84, No. 11/12.
D. J. Gravesteijn, "Single Wavelength Optical Recording in Pure, Solvent Coated Infrared Dye Layers," *Proc. SPIE*, vol. 420.
G. E. Johnson et al., "Laser Marking of Ablative Organic Dye-in-Polymer Films," *Proc. SPIE*, vol. 420, 1983.
Kock-Yee Law et al., "Ablative Optical Recording Using Organic Dye-in-Polymer Thin Films: Some Mechanistic Aspects," *J. Appl. Phys.*, 54(9), Sep. 1983.
Mool C. Gupta, "Laser Recording on an Overcoated Organic Dye-Binder Medium," *Applied Optics*, vol. 23, No. 22, Nov. 15, 1984.
Hideaki Oba et al., "Organic Dye Materials for Optical Recording Media," *Applied Optics*, vol. 25, No. 22, Nov. 15, 1986.
Hun-Jan Tao et al., "An Experimental Study of Write-Once-Read-Many (WORM) Optical Disks," *MRL Bull. Res. Dev.*, vol. 4, No. 1, 1990, pp. 1-8.
Roff et al. "Handbook of Common Polymers" ©1971 Section 6.1-6.9.

*Primary Examiner*—Charles L. Bowers, Jr.
*Assistant Examiner*—Martin J. Angebranndt
*Attorney, Agent, or Firm*—Kinney & Lange

[57] ABSTRACT

A dye containing solution composition for use in forming optical recording media comprises about 0.1 to about 5 parts cyanine dye; about 0.1 to about 5 parts polyvinyl acetate resin and about 100 to about 90 parts co-solvents. The dye containing solution is applied to a substrate of an optical recording medium by a spin coating process to form a recording layer having a uniform thickness. The resultant optical recording medium is suitable for reading and writing with a laser beam.

15 Claims, 8 Drawing Sheets

ORGANIC DYE-IN-POLYMER (DIP) MEDIUM FOR WRITE-ONCE-READ-MANY (WORM) OPTICAL DISCS

This is a continuation of application Ser. No. 07/615,616 filed on Nov. 19, 1990, abandoned as of the date of this application.

BACKGROUND OF THE INVENTION

The present invention relates to optical recording media adapted for storing information. In particular, the invention relates to a dye-in-polymer coating for use in an optical recording media.

Optical recording media are used for high density information storage. In an optical recording system, typically an optical disc is rotated at a high speed and a laser is used for both reading and writing information. A surface of the optical disc has optical properties which can be changed in order to store information.

Organic optical media have recently been used for fabricating Write-Once-Read-Many (WORM) optical discs. Typically, information is recorded by producing pits in a dye covered surface of the storage medium. In general, an organic storage medium using pits to store information can either be vapor-deposited or spin coated onto a substrate. Organic dye is sometimes spin coated along with a polymer matrix, often called a "dye-in-polymer (DIP)" system. However, an organic dye can be spin coated onto substrates alone by using a suitable solvent. This is referred to as a single dye system.

A single dye system has the advantage of simplicity, but suffers from lack of precise control of the thickness of the medium during the spin coating deposition process. The thickness of the recording layer significantly influences the read-write characteristics of the disc, especially the carrier-to-noise ratio. Therefore, it is important to be able to control the thicknesses of a recording layer.

SUMMARY OF THE INVENTION

The present invention provides a dye-in-polymer (DIP) coating for use in optical recording. The coating of the present invention may be deposited using a spin coating deposition process and the resultant recording layer provides a high quality optical recording medium.

The present invention overcomes problems associated with the prior art by incorporating suitable polymer binders in the dye solution to obtain a uniform film on the substrate of the recording medium. In the present invention, a dye-in-polymer coating is deposited using a two component co-solvent. The co-solvent provides adequate wettability of the dye-in-polymer solution along with an acceptable evaporation rate during spin coating deposition.

In accordance with the present invention, a dye containing solution composition for use in forming an optical recording media comprises about 0.1 to about 5 parts cyanine dye; about 0.1 to about 5 parts polyvinyl acetate resin; about 0.1 to about 0.01 parts singlet oxygen quencher and about 100 to about 90 parts co-solvents. The solubility of the cyanine dye in the co-solvent is at least about 1 percent. The co-solvent comprises a mixture of about 50 to about 90 percent by weight solvent and about 50 to about 10 percent by weight alcohols which have a boiling point lower than about 100° C. The solvent comprises 2-ethoxyethanol. This is available from Union Carbide Corp., Old Ridgebury Road, Danbury, Conn. under the name Cellosolve. However, dimethyl formamide or dimethyl sulfoxide may also be used as solvents.

In a preferred embodiment, the average molecular weight of polyvinyl acetate resin used in the present invention is between about 10,000 and about 1,000,000 and the cyanine dye has a maximum absorption wavelength from about 750 to about 850 nm. The alcohols are selected from the group consisting of methanol and ethanol. A substrate suitable for this invention is, for example polymethyl methacrylate or polycarbonate. In a preferred embodiment of the present invention, the dye containing solution composition is composed of about 1 part cyanine dye, about 0.01 parts singlet oxygen quencher, about 2 parts polyvinyl acetate resin, about 32 parts methanol and about 64 parts 2-ethoxyethanol.

An optical recording medium made in accordance with the present invention comprises a substrate and a recording layer carried on the substrate. The recording layer is made with the dye containing solution composition of the present invention by a spin coating deposition process. After evaporation of a solvent which carries the dye and polymer, the resulting recording layer includes about 0.1 to about 5 parts cyanine dye, about 0.1 to about 0.01 parts singlet oxygen quencher, and about 0.1 to about 5 parts polyvinyl acetate resin. Preferably, the recording layer obtained is composed of about 1 part cyanine dye, about 0.01 parts singlet oxygen quencher, and about 2 parts polyvinyl acetate resin.

The dye-in-polymer solution composition of the present invention may be deposited by spin coating a substrate. The substrate is mounted on a turntable. By rotating the substrate, the dye-in-polymer solution will spread circumferentially over the surface of the substrate. This allows a very thin layer of the dye to be deposited. The thickness of the layer depends on the spin speed of the substrate.

In accordance with the present invention, the addition of 2-ethoxyethanol to the DIP solution: (1) decreases the evaporation rate of the solution used; (2) increases the adhesion and the wettability between the recording layer and the substrate; and (3) increase the solubility of dye in the solution. The incorporation of low boiling point alcohols to the DIP solution composition increases the evaporation rate of the solvents and reduces damage produced by 2-ethoxyethanol. Use of alcohols or 2-ethoxyethanol individually cannot produce a recording layer by spin coating which is both thin and uniform in thickness.

The substrate used in the optical recording medium according to this invention may be those well known to the ordinary worker in the art and may be either transparent or opaque to a laser beam. However, where recording is from the substrate side with a laser beam, the substrate material must be transparent to the writing laser beam. The substrate material generally used as an optical information media typically comprises glass, quartz, ceramics, plastics, paper, plate-like or foil-like metal and the like. Among these materials, plastics are particularly suitable. Typical plastics include polymethyl methacrylate, polycarbonate resin and the like.

DETAILED DESCRIPTION OF THE PREFERRED EMBODIMENTS

The present invention provides a dye-in-polymer (DIP) medium whose thickness can be precisely controlled with a spin coating process. This is achieved by formulating a mixture of solvents which can: (1) properly dissolve binders and dyes; (2) leave the grooves of the underlying substrate intact; and (3) form a suitable recording layer which has a controllable thickness.

Figure 1:
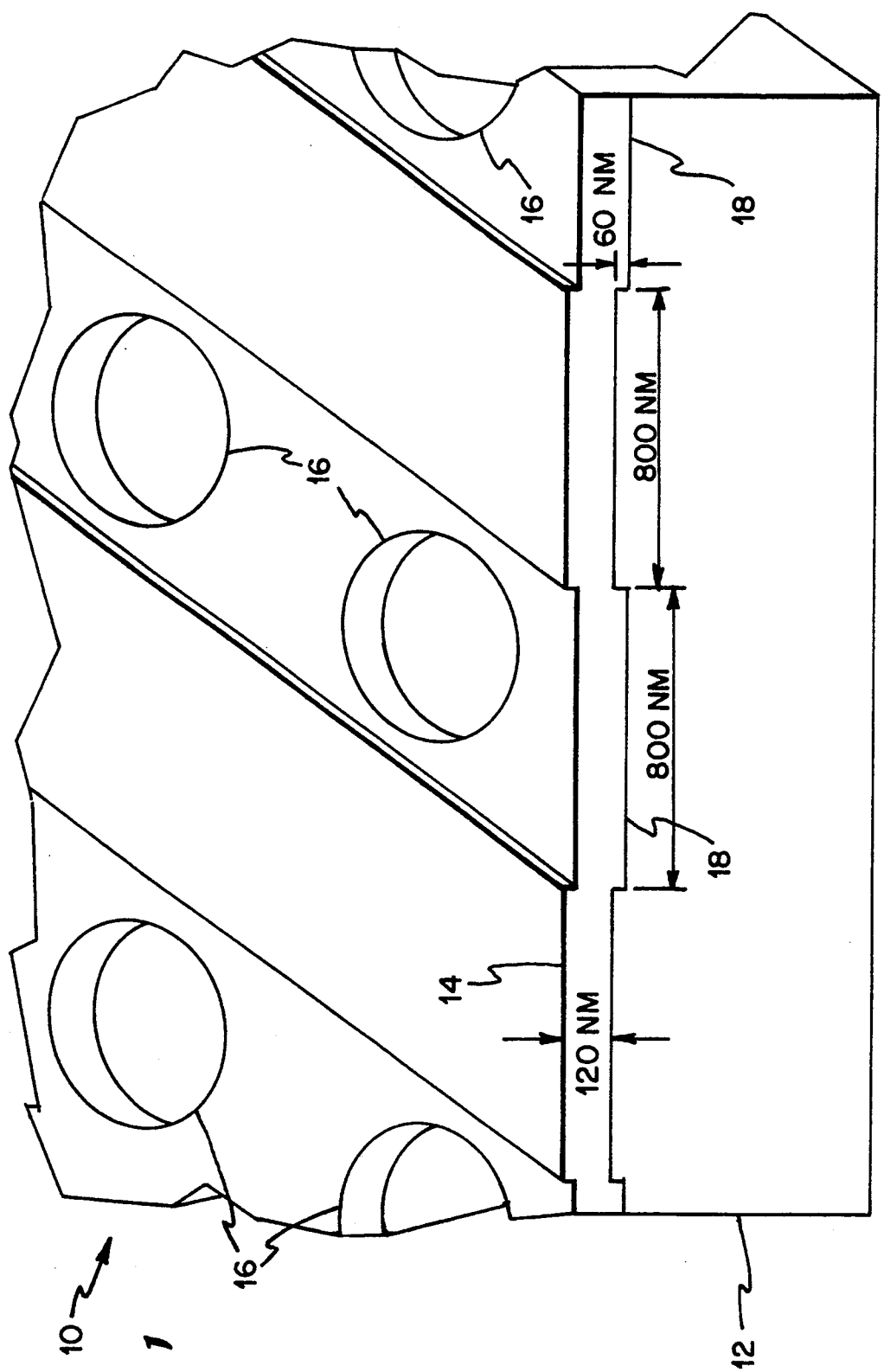
FIG. 1 is cross-sectional plan view of an optical storage medium.

FIG. 1 shows a schematic of the structure of an optical disc 10. Optical disc 10 comprises a substrate 12. Substrate 12 comprises a pregrooved poly(methylmethacrylate) (PMMA) or a polycarbonate (PC) substrate. These substrates are available from Kyowa Gas Chemical Industry and Idemitsu OMD CO., respectively. A DIP layer 14 of cyanine dye in acetate polymer is coated on the surface of substrate 12. The thickness of dye layer 14 is about 120 nm. A cyanine dye (CY-9) with an absorption maxima around 780 nm, supplied from Nippon Kayaku, was used to form DIP layer 14. Pits 16, which represent encoded information, are written in DIP layer 14. Substrate 12 includes generally parallel grooves 18 which are about 800 nm wide and have a depth of about 60 nm.

Various dye-in-polymer solutions were applied onto PMMA or PC substrates by spin coating. A small quantity (about 0.01 percent by weight) of a singlet oxygen quencher (product No. MIR-1011, available from Midori Kagaku Co.) was added to each dye-in-polymer solution. Spin speeds were set between 1,000 and 6,000 rpm, depending on the desired film thickness. Polyvinyl acetate (Aldrich, Catalog #18,948-0, medium molecular weight) was used as polymer matrix (binder). In the coating solution, the dye was about 1 percent by weight and the binder (polyvinyl acetate) was about 2 percent by weight.

A preferred formulation was about 20 to about 40 percent by weight of methanol and about 80 to about 60 percent weight of 2-ethoxyethanol. Use of a two component co-solvent system allows adequate wettability of the dye-in-polymer solution along with an acceptable evaporation rate during the spin coating process. For example, the addition of acetonitrile, chloroform or 2-ethoxyethanol was capable of dissolving the PMMA substrates, and could be incorporated into the systems to increase wettability. On the other hand, methanol and n-butanol would not dissolve the PMMA substrates and could be used to adjust the evaporation rate. The evaporation rate was lowered by using n-butanol, because n-butanol has a relatively high boiling point. Methanol was used to increase the evaporation rate. This co-solvent system must balance three competing factors: (1) the minimum dissolution of the grooves of the PMMA substrate; (2) the best wettability; and (3) the optimum evaporation rate.

Furthermore, the coating performance of formulations in accordance with the present invention depends on relative humidity of the spin coating environment. Successful coatings were obtained at about 60% relative humidity. For continuous-homogeneous films, the relative humidity should be less than about 75%.

Figure 2:
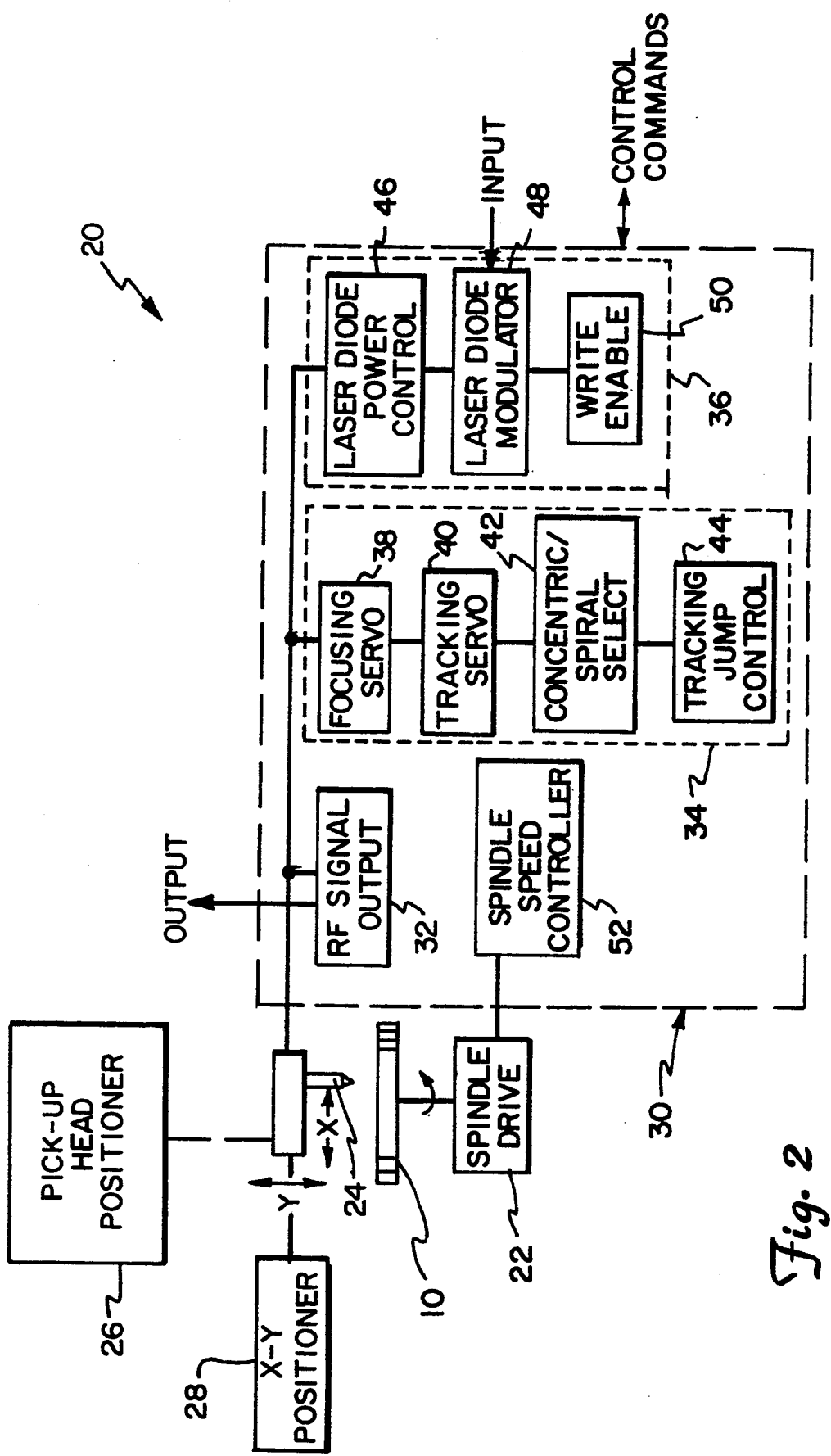
FIG. 2 is a block diagram of an optical disc information storage and testing system.

FIG. 2 is a block diagram of an optical disc storage and test system 20. Optical disc storage and test system 20 includes an optical disc 10 connected to a spindle drive motor 22. An optical pick-up assembly 24 is positioned adjacent the surface of optical disc 10. Optical pick-up and assembly 24 is connected to pick-up positioner 26 and X-Y positioner 28. Optical pick-up assembly 24 provides an input and output coupled to control circuitry 30. Optical pick-up assembly 24 is connected to RF signal output circuit 32, position control circuit 34, and power control circuit 36. Position control circuit 34 includes servo control circuit 38, tracking servo circuit 40, concentric/spiral select circuit 42 and tracking jump control circuit 44. Power control circuit 36 includes laser diode power control circuit 46, laser diode modulator circuit 48 and write enable circuit 50. Control circuit 30 also includes a spindle speed controller 52 coupled to the spindle drive motor 22.

In operation, spindle drive motor 22 receives spindle speed control commands from spindle speed controller 52 and causes optical disc 10 to rotate. Optical pick-up assembly 24 is positioned by X-Y positioner 28 and pick-up head positioner 26. Positioning of optical pick-up assembly 24 is through control commands from focusing servo 38, tracking servo 40, concentric/spiral select circuit 42 and tracking jump control circuit 44. Power to optical pick-up assembly 24 is controlled by power control circuit 36 through laser diode power control circuit 46, laser diode modulator 48 and write enable circuit 50. During readback of stored information, RF signal output 32 provides an output representative of information optically stored upon the surface of optical storage disc 10. An input signal is supplied to laser diode modulator 48. Control circuitry receives control commands from a control bus which controls operation of optical storage and test system 20. For testing purposes, the output from RF signal output circuit 32 can be applied to test apparatus such as a spectrum analyzer.

Figure 3:
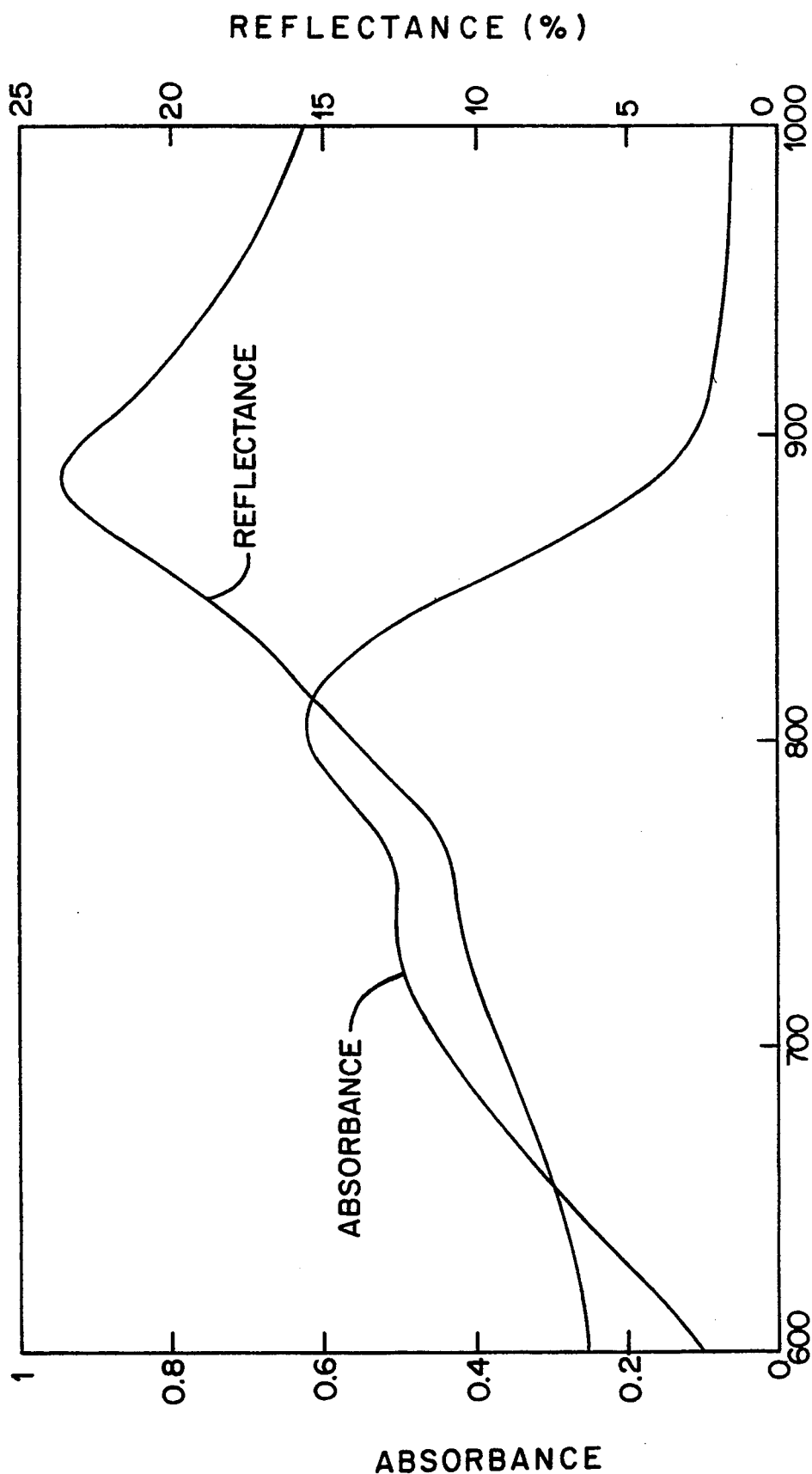
FIG. 3 shows the absorption and reflection spectrum of a recording layer made in accordance with the present invention.

FIG. 3 shows a typical absorbance and reflectance spectra of an optical media made in accordance with the present invention. The thickness of the recording layer was about 120 nm. At a laser diode wavelength of 780 nm, the absorption was about 61 percent and the reflectance was about 12 percent.

Figure 4:
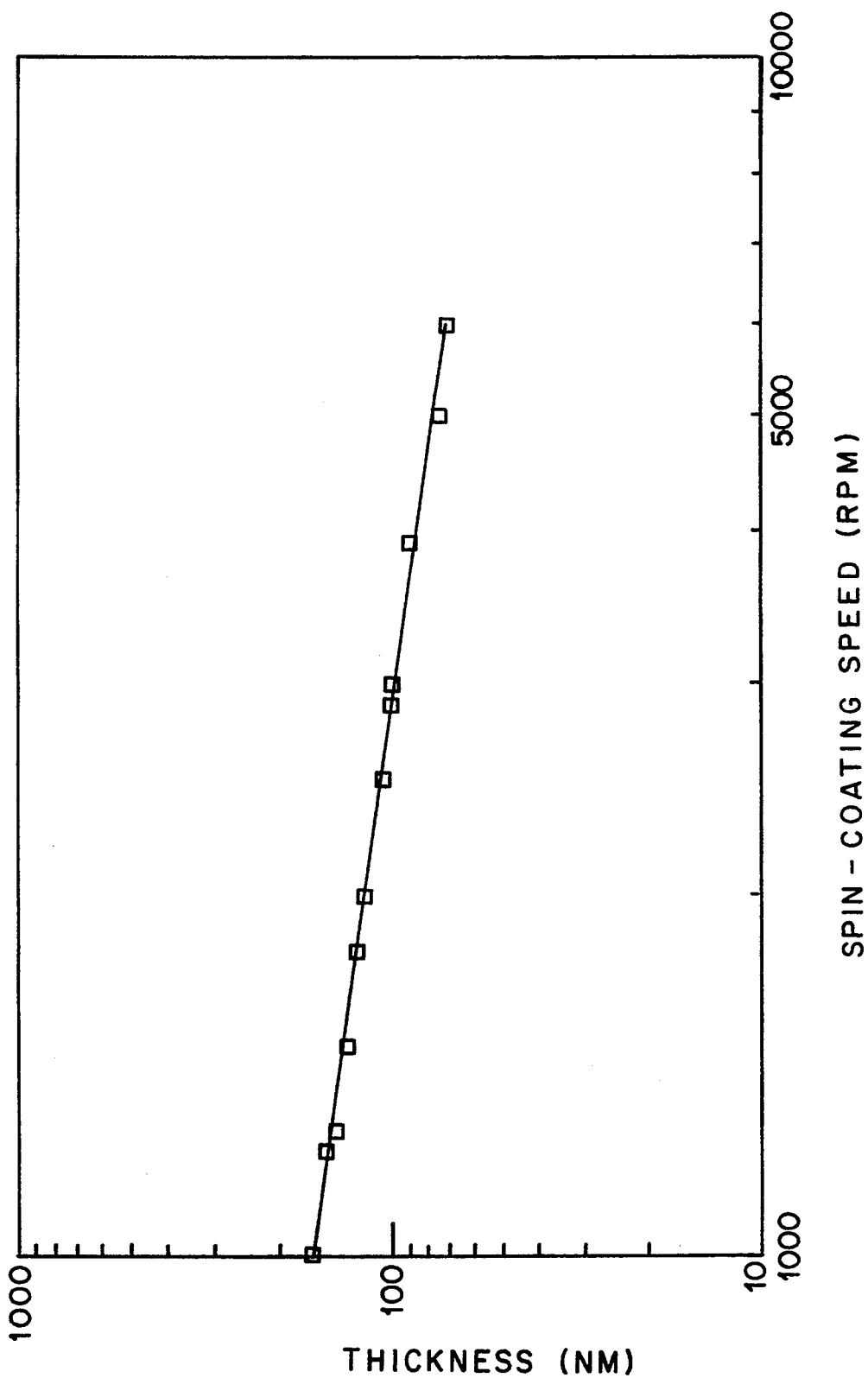
FIG. 4 is a graph which shows the thickness of a recording layer formed in accordance with the present invention relative to spin speed of a spin coating process.

The thicknesses of the recording layer can be controlled by adjusting the spin speed. A plot of log (thickness) versus log (spin speed) is shown in FIG. 4. The slope is about $-0.47 \pm 0.06$ (95% confidence interval), compared to about -0.5 for a spin coating process which behaves in a Newtonian manner.

Figure 5:
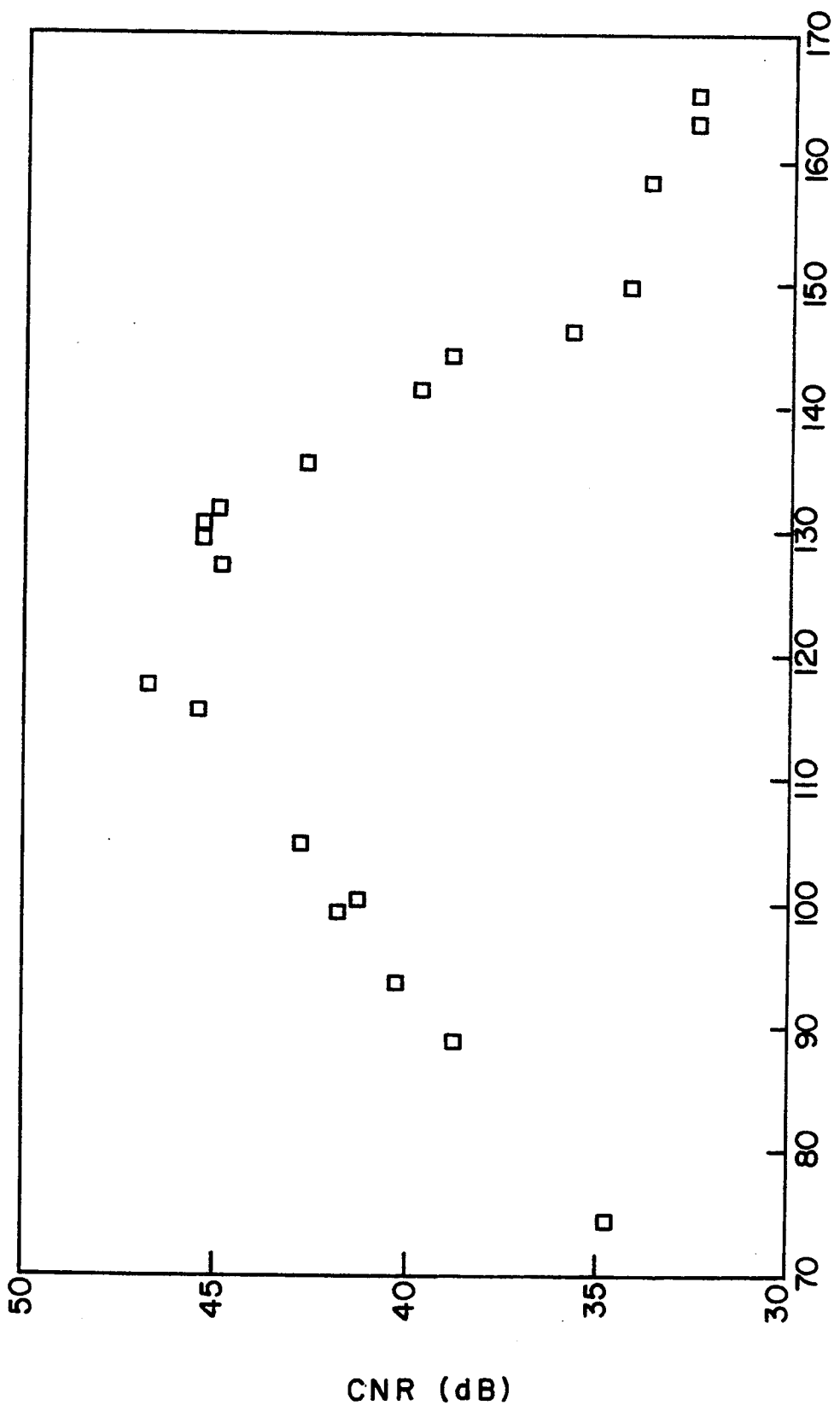
FIG. 5 shows carrier-to-noise ratio as a function of thickness of an optical recording layer.
Figure 6:
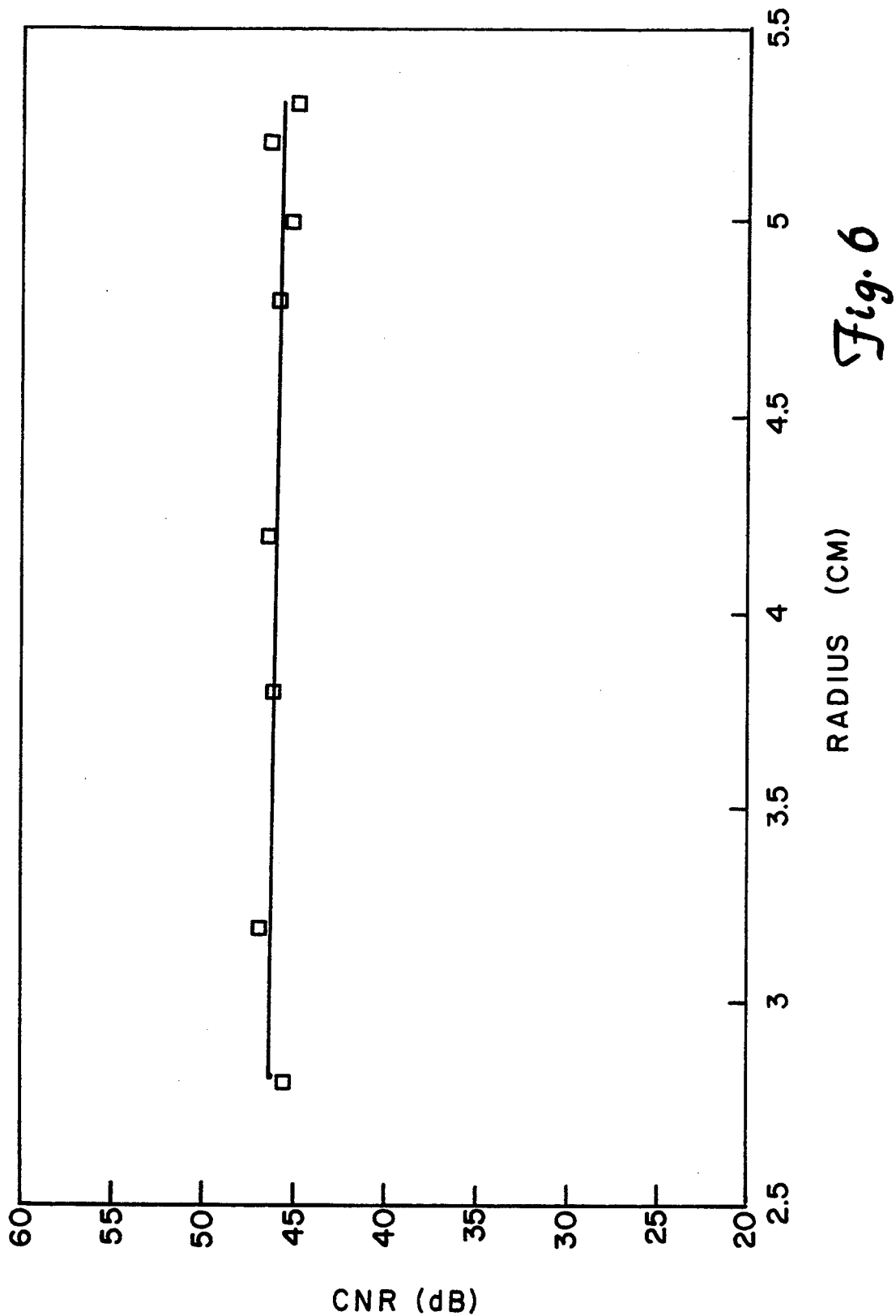
FIG. 6 is a graph which shows the relationship between carrier-to-noise ratio and location of recording pits of an optical recording disc.

FIG. 5 shows the dependence of the carrier-to-noise ratio (CNR) to the thickness of the recording layer. The optimum thickness is about 120 nm. The uniformity of the film thickness can be found in FIG. 6. The carrier-to-noise ratio (CNR) ranges from about 47 dB to about 45 dB for measurements from the inner toward the outer diameter of the disc under test. According to FIG. 6, there will be about a 20 nm variation of thickness for a recording layer of about 120 nm thickness.

Figure 7:
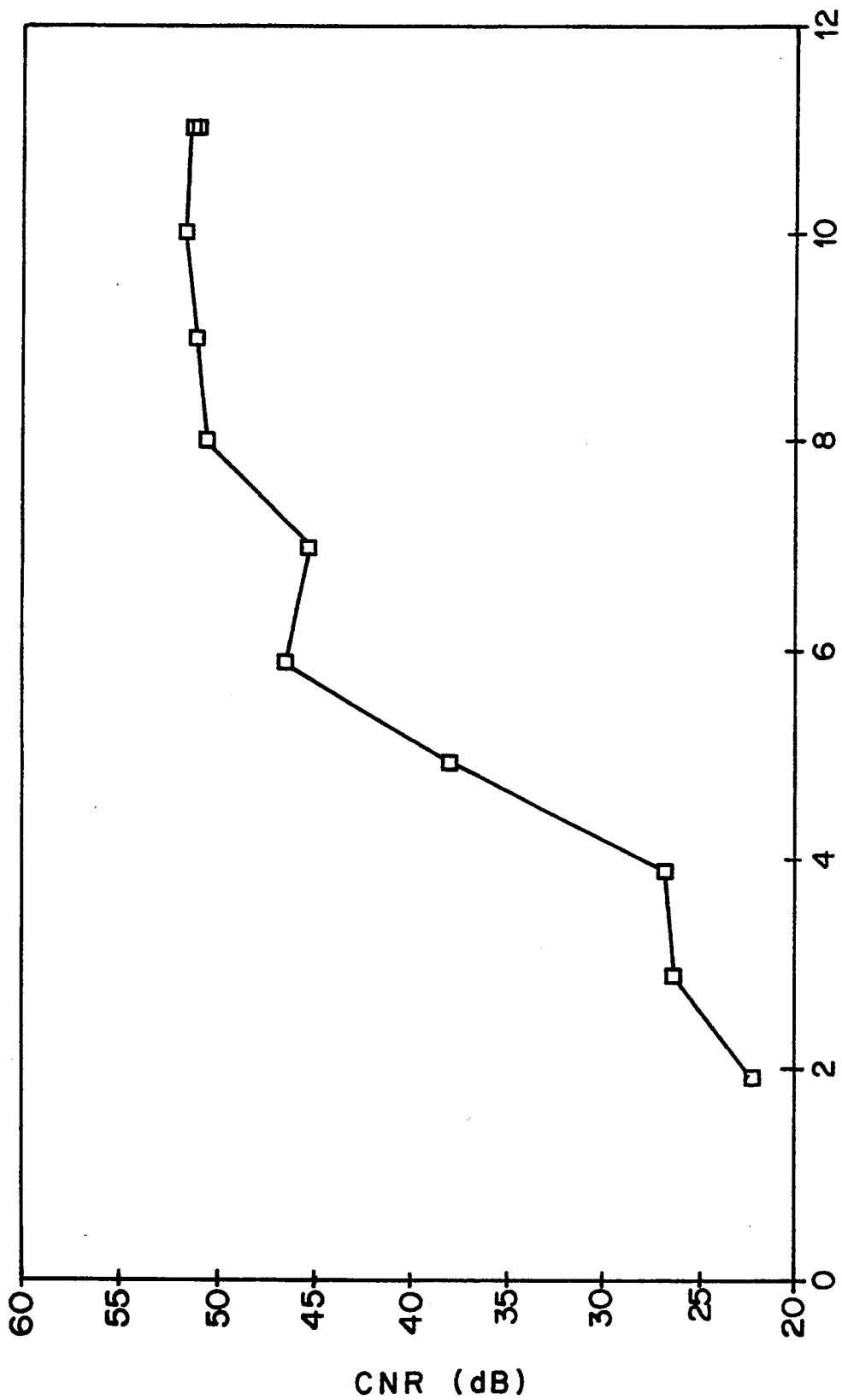
FIG. 7 is a graph which shows the relationship between carrier-to-noise ratio and writing power in an optical recording system.

FIG. 7 shows a typical plot of carrier-to-noise ratio (CNR) versus laser diode writing power. The linear velocity was about 4.84 m/sec. The pit that was recorded had a length of about 14 μm (200 kHz at 50% duty cycle) in the grooved area of the disc. The carrier-to-noise ratio was almost constant over 8 mW. This indicates the tolerance of laser power fluctuation.

Figure 8:
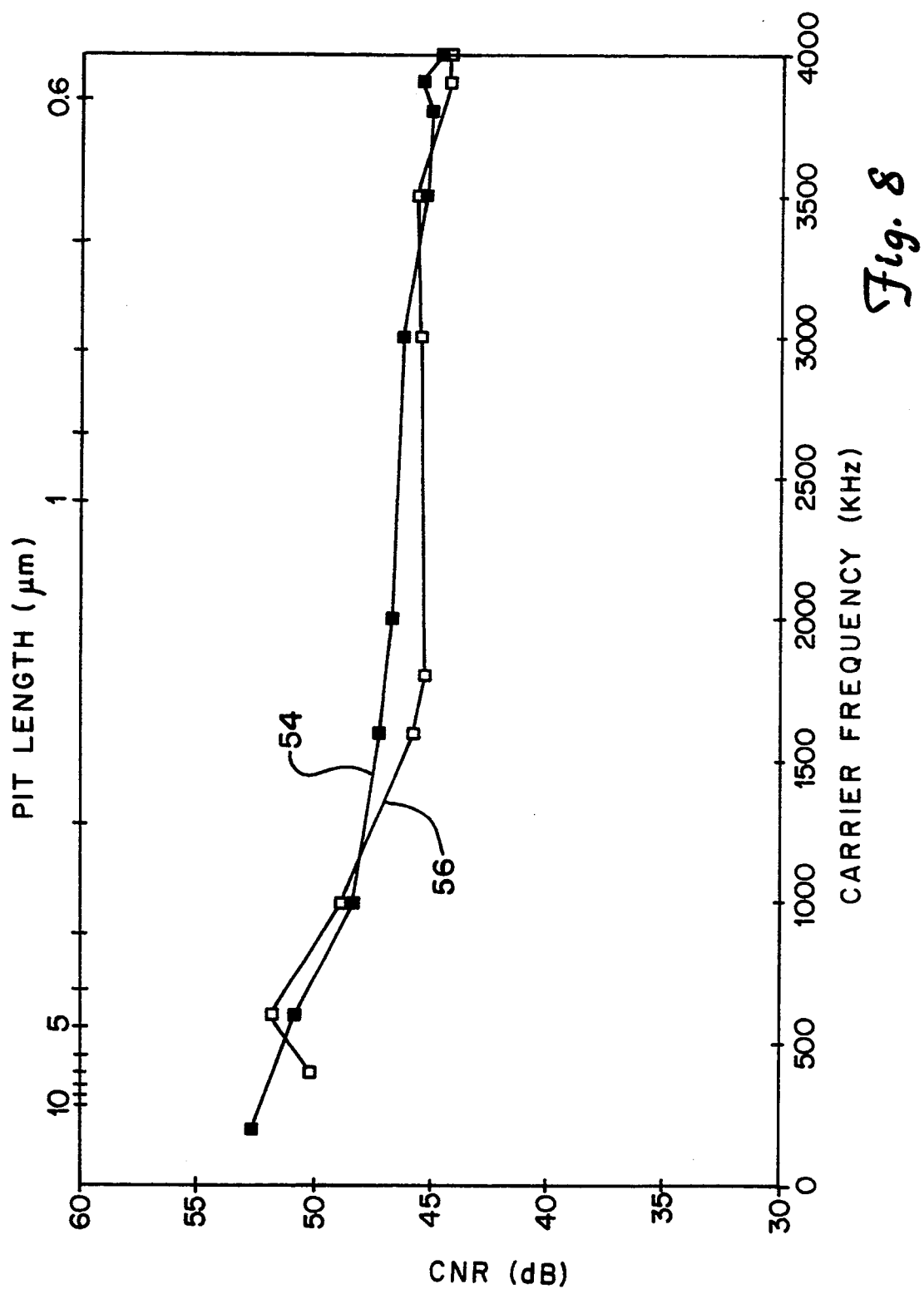
FIG. 8 is a graph which shows the relationship between carrier-to-noise ratio and carrier frequency or pit length in an optical recording system.

FIG. 8 shows performance of carrier-to-noise ratio versus carrier frequency and carrier-to-noise ratio versus pit length for discs made in accordance with the present invention (54) and with a commercially available WORM disc (56). As noted, the carrier-to-noise ratio of the optical disc was over 45 dB for pit length as low as 0.53 μm. In other words, the resolution of the dye-in-polymer recording layers of the present invention produced high recording density and was comparable to single-dye layers. A brightfield photomicrograph test of pits with different pit lengths showed that the read-write characteristics of the disc exhibited no sign of change after 1800 hours of diffuse daylight at about 20° C. and 65% relative humidity.

A number of preferred embodiments of the present invention were tested. In one example, one part of CY-9 dye (cyanine dye available from Nippon Kayaku) was mixed with 2 parts polyvinyl acetate resin (available from Aldrich, middle molecular weight), 32 parts methanol, 64 parts 2-ethoxyethanol and 0.01 parts MIR-1011 singlet oxygen quencher (available from Midori Kagaku) and dissolved therein. The solution obtained was filtered through a 0.2 μm filter and the filtrate was collected. About 1.5 ml filtrate was applied to a 5.25" substrate of polymethyl methacrylate (available from Kyowa Gas Chemical Industrial). The substrate was rotated with a spin speed of about 2000 rpm for about 1.5 minutes to obtain a uniform recording layer. The thickness of the recording layer was about 120 nm. The optical information recording media were exposed to a laser beam of 780 nm wavelength.

The writing by laser diode was with a writing power of about 10 mW, a carrier frequency of about 4 MHz, a linear velocity of about 4.84 m/sec and a reading power of about 0.9 mW. The resulting optical storage medium contained pits with dimensions of about 0.53 μm and a carrier-to-noise ratio of about 47 dB. The absorption and reflection spectrum of the optical information recording medium is shown in FIG. 3. As shown in FIG. 4, the thickness of the recording layer can be varied depending upon the spin speed of spin coating. The carrier-to-noise ratio of the final produce relative to the thickness of the recording layer is shown in FIG. 5. According to the solution composition of the present invention, the thickness of the recording layer and the carrier-to-noise ratio value is controllable.

For comparison, these results were compared with the coating results obtained by a dye containing solution without adding polymer binder.

To obtain a dye without polymer binder, one part CY-9 was mixed with 99 parts methanol and dissolved. This solution was filtered and the filtrate was collected. About 1.5 ml of the filtrate was applied on a 5.25 inch substrate of polymethyl methacrylate. The substrate with the solution was then processed by spin coating. The surface of the resultant optical recording media was redeposited with CY-9 crystals. The optical recording medium of this example could not be adapted for laser diode reading and writing.

In another comparison test, methanol was replaced with the various solvents shown in Table 1. The results are shown in Table 1.

TABLE 1

| Solvent | Results |
| --- | --- |
| Ethanol | Dye crystallizes. |
| iso-Propanol | |
| n-Butanol | |
| Acetone | Cloudy. |
| Pyridine | |
| THF | |
| Chloroform | |
| 1,2-Dichloroethane | |
| DMF | Poor wettability |
| DMSO | and adhesion. |
| 2-ethoxyethanol | |
| Dioxane | |
| Acetonitrile | Solvent damaged the |
| Nitromethane | substrate and film |
| Nitroethane | thickness was not controllable. |

A second comparison test was conducted and the results are shown in Table 2. Table 2 shows the results of various combinations of CY-9, solvent and polyvinyl acetate. None of the compositions of Table 2 provided a suitable medium for recording optical encoded information.

TABLE 2

| CY-9 (parts) | Solvent (parts) | Polyvinyl Acetate (parts) | Results |
| --- | --- | --- | --- |
| 1 | methanol 100 | 1 | cloudy |
| 0.5 | ethanol 100 | 1 | cloudy |
| 0.5 | n-propanol 100 | 1 | poor wettability |
| 0.1 | n-butanol 100 | 1 | poor wettability |
| 2 | acetone 100 | 6 | not uniform |
| 2 | acloroform 100 | 6 | not uniform |
| 2 | acetonitrile 100 | 6 | not uniform |
| 1 | 2-ethoxyethanol 100 | 6 | not uniform |
| 0.5 | methanol/n-butanol 100 | 4 | not uniform |
| 0.5 | actone/methanol 100 | 4 | not uniform |
| 0.5 | methanol/chloroform 100 | 4 | not uniform |

In the fabrication of optical discs, the present invention provides a co-solvent system for spin coating dye-in-polymer optical medium on PMMA or PC substrates. The slope of log (thickness) versus log (spin speed) plot is 0.47±0.06. The thickness can be accurately controlled by adjusting spin speed for the purpose of optimizing carrier-to-noise ratio. The thickness of the dye layer should be between about 70 nm and about 110 nm. An optimum thickness of the dye-in-polymer recording layer of the present invention is about 120 nm. A carrier-to-noise ratio of 45 dB was achieved with 0.53 μm length recording pits. This yields a high recording density. The dye-in-polymer system in accordance with the present invention is suitable for WORM optical recording systems.

The present invention provides a number of advantages over the prior art. The present invention does not damage grooves carried on the substrate of the optical disc. A recording layer formed in accordance with the present invention provides a high quality film, i.e. the film is not milky or cloudy. The dye of the present invention has a solubility such that a film deposited upon the substrate surface has a high optical density. The dye made in accordance with the present invention is dissolved in a polymer binder which does not crystallize during the evaporation of the solvent which carries the dye. The present invention provides good wettability and adhesion between the recording layer and substrate. Furthermore, the thickness of the resultant recording layer can be precisely controlled by the spin speed of the spin coating process. The present invention provides a dye with high radiation absorbance at around an 800 nm wavelength.

The present invention provides a dye containing solution composition for use in forming an optical recording medium which can be adapted for reading and writing information with a radiation emitting source such as a laser beam. The carrier-to-noise ratio of a recording layer formed in accordance with the present invention is about 45 dB with a pit length of about 0.53 μm.

In addition, the present invention provides a thin recording layer which has a high optical density and a high carrier-to-noise ratio value.

Although the present invention has been described with reference to preferred embodiments, workers skilled in the art will recognize that changes may be made in form and detail without departing from the spirit and scope of the invention. For example, although 2-ethoxyethanol was used as a solvent, dimethyl formamide or dimethyl sulfoxide are alternatives.

What is claimed is:

1. A dye-in-polymer composition for use in forming an optical recording layer comprising:
    a cyanine dye;
    polyvinyl acetate; and
    a co-solvent solution including a first solvent comprising 2-ethoxyethanol for wetting a surface of a substrate and about 10 to about 50 percent-by-weight of a second solvent for increasing an evaporation rate of the composition, wherein the second solvent is an alcohol which has a boiling point less than 100° C.

2. The dye composition of claim 1 wherein the cyanine dye is about 0.1 to about 5 parts and the polyvinyl acetate is about 0.1 to about 5 parts.

3. The dye composition of claim 1 wherein the cyanine dye is about 0.1 to about 5 parts and the co-solvent is about 100 to about 90 parts.

4. The dye composition of claim 1 including a singlet oxygen quencher.

5. The dye composition of claim 4 wherein the singlet oxygen quencher is about 0.1 to about 0.01 parts and the co-solvent is about 100 to 90 parts.

6. The dye composition of claim 1 wherein the polyvinyl acetate is about 0.1 to about 5 parts and the co-solvent is about 100 to 90 parts.

7. The dye composition of claim 1 wherein the average molecular weight of the polyvinyl acetate is between about 10,000 and about 1,000,000.

8. The dye composition of claim 1 wherein the cyanine dye has a maximum absorption wavelength between about 750 nm and about 805 nm.

9. A dye containing solution composition for use in forming an optical recording medium comprising:
    about 0.1 to about 5 parts cyanine dye;
    about 0.1 to about 0.01 parts singlet oxygen quencher;
    about 0.1 to about 5 parts polyvinyl acetate resin; and
    about 100 to about 90 parts co-solvent, wherein the solubility of the cyanine dye in said co-solvent is at least 1 percent by weight and the co-solvent is a mixture of about 10 to about 50 percent by weight alcohols having boiling point lower than about 100° C. and about 90 to about 50 percent by weight 2-ethoxyethanol.

10. The dye containing solution composition as claimed in claim 9, wherein the average molecular weight of the polyvinyl acetate resin is between about 10,000 and about 1,000,000.

11. The dye containing solution composition as claimed in claim 9, wherein the cyanine dye has a maximum absorption wavelength between about 750 nm to about 805 nm.

12. The dye containing solution composition as claimed in claim 9, wherein the alcohol is selected from the group consisting of methanol and ethanol.

13. A method of forming an optical recording layer on a surface of a substrate, comprising:
    mixing about 0.1 to about 5 parts cyanine dye with about 0.1 to about 5 parts polyvinyl acetate, about 0.1 to about 0.01 parts singlet oxygen quencher to form a dye composition mixture, and about 100 parts to about 90 parts co-solvent which includes 2-ethoxyethanol as a first solvent for wetting the surface of the substrate and an alcohol having a boiling point of less than about 100° C. as a second solvent for increasing an evaporation rate of the co-solvent; and
    applying the dye composition mixture to a surface of the substrate by spin coating.

14. The method of claim 13 wherein spin coating comprises spin coating between about 1,000 rpm and about 6,000 rpm.

15. An optical storage system for optically storing information, comprising:
    a substrate having an information carrying surface;
    a layer of a dye-in-polymer composition coated on the information carrying surface of the substrate, wherein the dye-in-polymer composition is coated with a composition comprising:
    about 0.1 to about 5 parts cyanine dye;
    about 0.1 to about 0.01 parts singlet oxygen quencher;
    about 0.1 to about 5 parts polyvinyl acetate resin; and
    about 100 to about 90 parts co-solvent, wherein the solubility of the cyanine dye is said co-solvent is at least 1 percent by weight and the co-solvent is the mixture of about 10 to about 50 percent by weight alcohols having boiling points lower than about 100° C. and about 90 to about 50 percent by weight 2-ethoxyethanol;
    a radiation source for directing radiation on the information carrying surface of the substrate; and
    a radiation sensor for detecting radiation reflected from the information carrying surface of the substrate wherein pits in the layer of dye on the information carrying surface of the substrate are representative of stored information.

* * * * *